United States Patent Office 3,391,914
Patented July 9, 1968

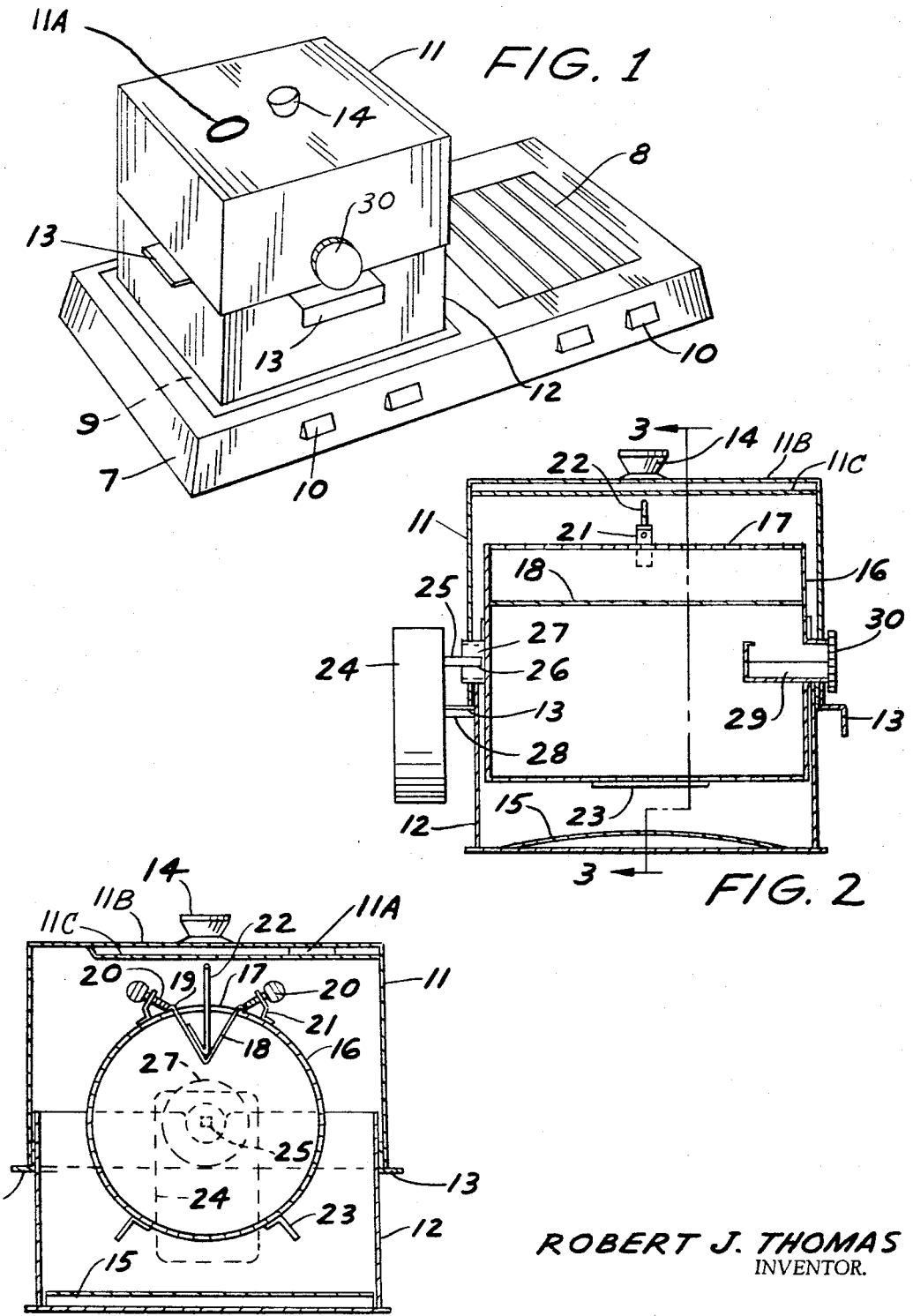

3,391,914
PORTABLE DOMESTIC ROASTER
Robert J. Thomas, 3451 Academy,
Dearborn, Mich. 48124
Filed Feb. 8, 1967, Ser. No. 614,574
5 Claims. (Cl. 263—34)

ABSTRACT OF THE DISCLOSURE

This application discloses a portable, power driven, tumble type of roaster for use on a domestic cook stove, constructed of few moving parts and arranged for quick assembly and disassembly, and for easy loading and unloading, and the quick testing of the contents while being roasted. The disclosure also includes a heat diffuser and contents agitator.

Specifications

This invention relates to a device for roasting peanuts, coffee, or any food product, or commodity that has to be tumbled or gently agitated over heat.

An object of the invention is to provide a lightweight, portable, power driven, tumble type roaster, which can be used on a domestic cook stove or heater, of either gas or electric, or other heat source.

Another object of the invention is the provision of a domestic roaster which is simple in construction, economical to manufacture and efficient in operation.

Another object of the invention is the provision of a device of the character indicated which is easy to assemble and disassemble, and one which may be stored in a limited space.

Another object of the invention is the provision of a device of the character indicated which is easy to load and unload for cooling the contents.

Another object of the invention is the provision of a device of the character indicated which is constructed with means whereby the contents being roasted may be easily tested while the device is in operation.

Another object of the invention is the provision of a device of the character indicated with means to effect the uniform agitation of the product being roasted, during the roasting cycle.

Another object of the invention is the provision of a device of the character indicated which is constructed and arranged for efficient use on a domestic cook stove, with means for diffusing the heat throughout the device.

Another object of the invention is the provision of a device of the character indicated which is provided with a drum in which the products may be tumbled so that there is an even distribution of heat throughout and little, if any, possibility of scorching the contents.

Another object of the invention is the provision of a device of the character indicated which is constructed and arranged with easily demountable parts, particularly the drive mechanism, so that the contents being roasted may quickly be removed for cooling.

The foregoing and other objects and advantages of the invention will become more apparent as the description proceeds, reference being made from time to time to the accompanying drawing, forming part of the within disclosure, in which drawing:

FIG. 1 is a perspective view of a device mounted for use on a conventional domestic hot plate.

FIG. 2 is a vertical section taken through the device embodying the invention.

FIG. 3 is a section taken substantially on the line 3—3 of FIG. 2.

Referring now more particularly to the drawings it will be understood that in the embodiment herein disclosed, the reference character 7 indicates a domestic hot plate, on which is positioned the device embodying the invention. The hot plate 7 may have as its heat source oil, gas or electricity. In the embodiment disclosed the hot plate is an electric unit with heating elements 8 and 9, which are controlled in conventional manner by means of control switches 10.

The elements just described constitute no part of the invention, except as they are combined with the elements hereinafter described.

The device embodying the invention consists of top and bottom housing members 11 and 12, which are preferably made of light gage metal. The top member 11 is provided with double walls 11B and 11C at the top for the better retention of the heat on the interior of the device and there is preferably a thermometer 11A positioned in the upper wall, so that the degree of heat may be known at all times during the roasting operation. The top member 11 is removable from the bottom member 12, and normally rests in overlying, telescoping, relation on support brackets 13 carried by the lower member 12. The cover member 11 is provided with an insulated hand grip 14 so that the cover 11 may be lifted off to permit the loading and unloading of the device.

The bottom member 12 is closed at its lower end by means of a removable convex member 15, which is preferably made of perforated metal or rigid screen material, which serves as a means for diffusing the heat evenly throughout the roaster. The member 12 rests on the flat flange portion of the diffuser 15 and can be lifted therefrom by using the brackets 13 as handles when the contents of the roaster are ready to be emptied and cooled as hereinafter described.

Mounted on the interior of the device, and supported in suitable bearing members carried on the walls of the lower member 12, is a drum or cylindrical member 16, made of perforated metal or screen, which has an opening 17 in one wall, which opening is closed by means of a V-shaped member 18, which extends into the interior of the cylinder 16 and serves as an agitator for the contents of the cylinder as the latter is rotated in operation.

The closure and agitator member 18 is provided with curved upper edges 19, which are arranged to receive the ends of thumb screws 20, which are rotatable in brackets 21, mounted on either side of the opening 17. The thumb screws 20 are intended to hold the closure and agitator 18 in position during the rotation of the cylinder 16.

The closure 18 is provided with a wire handle 22, which is welded or otherwise secured thereto, so that it may be removed when it is desired to load or unload the cylinder 16. When the closure 18 is secured in position by the thumb screws 20, the handle is also used to lift the drum 16 out of the housing 11–12.

The bottom of the cylinder 16 is provided with a pair of angular legs 23, so that the cylinder may be held in an upright position after it is removed from the housing 11–12.

The drum, or cylinder 16 is power driven by means of a motor and reduction gear assembly 24. The motor has a square extension 25 on its drive shaft, which square extension is received in a square recess 26, formed in the hub 27 of the cylinder 16.

The motor and transmission assembly 24 is slidably held in place by the element 28, so that the motor and transmission may quickly be removed from the cylinder when it is desired to empty the cylinder 16.

At the end of the cylinder 16, opposite the drive mechanism 24, is a rectangular receptacle 29 which extends well into the interior of the cylinder 16. The receptacle 29 is open at the top which permits peanuts, or other commodities, which are being roasted, to be received in the member 29 during the rotating of the cylinder 16. The member 29 may be slidably removed from the device by means of the insulated hand grip 30, so that the peanuts, or other commodity being roasted, may be tested from time to time as the roasting progresses.

In operation the device functions as follows:

The device may be loaded before, or after it is positioned on the heating element 9. Assuming that it is positioned on the heating element 9 before being loaded and before the heat is turned on, the top member 11 is first removed so that access may be had to the interior of the cylinder 16.

With the cylinder positioned as shown in FIGS. 2 and 3, the thumb screws 20 will first be loosened so that the closure-agitator member 18 may be lifted out by means of the handle 22. Peanuts or other commodity to be roasted are then dumped into the cylinder 16, and the cover agitator 18 is then replaced and locked into position by means of the thumb screws 20.

The top cover member 11 is then set into position over the bottom member 12 and the drive mechanism 24 is then set in position on the bracket 28, so that the square end of the drive shaft engages the hub portion 27 of the cylinder 16. In this condition the member 29 is extended its full length into the cylinder 16. Heat is then applied by means of the control switches 10 and the motor drive mechanism 24 is started.

As the roating cycle continues the contents of the cylinder 16 are tumbled and agitated on the inside of the cylinder by means of the agitator 18.

From time to time during the cycle the contents are tested by samples taken from the interior of the cylinder by means of the slide tester 29.

When the contents are completely roasted it is important that they be removed immediately from the roaster so that they will not be overroasted.

At the end of the roasting cycle the top cover member 11 and the driving mechanism 24-25 are first removed. The bottom member 12 and the cylinder 16 are then removed together from the diffuser and placed on a table or the like, using the brackets 13 as handles. In this operation the bottom member 12 serves as a bottomless saddle for the cylinder 16. The thumb screws 20 are then loosened and the closure-agitator 18 is removed from the opening 17. The cylinder 16 is then rotated 180° from the position shown in FIGS. 2 and 3, so that the contents of the cylinder may fall by gravity and be spread onto the table or other cooling surface to prevent over roasting.

The procedure just described is preferable and necessary to enable the user to safely and quickly handle and unload the cylinder 16, when the cylinder and its contents are at their highest temperature.

Having described my invention, what I claim and desire to secure by Letters Patent is:

1. A portable device for mounting on a domestic heat source, comprising, top and bottom cover members, a drum supported for rotation on the walls of said lower cover member, and removable power means for rotating said drum, both the said bottom and top cover members being provided with heat diffusing members, the heat diffusing member of the bottom comprising a removable, convex wall of perforated metal and the heat diffusing member of the top cover comprising a flat spaced inside wall.

2. A portable device for mounting on a domestic heat source, comprising, top and bottom cover members, a drum supported for rotation on the walls of said lower cover member, and removable power means for rotating said drum, said drum being provided with a cut out portion and a closure member for said cut out portion, said closure member having converging side walls extending well into the interior of said drum and serving as an agitator for the contents carried in said drum.

3. A portable device for mounting on a domestic heat source, comprising, top and bottom cover members, a drum supported for rotation on the walls of said lower cover member, and removable power means for roating said drum, said drum having a tray like element slidably mounted near its axis and movable from the interior to the exterior of said drum, and adapted to catch samples of the contents of the drum so the contents can be sampled.

4. A portable device for mounting on a domestic heat source, comprising, top and bottom cover members, a drum supported for rotation on the walls of said lower cover member, and removable power means for rotating said drum, said drum being provided with a cut out portion and a V shaped in cross section closure member extending into said cut out portion, said closure member having means to lock it to said drum, and a bail like handle secured to the exterior of said closure member.

5. A portable device for mounting on a domestic heat source, comprising, top and bottom cover members, a drum provided with a cut out portion supported for rotation on the walls of said lower cover member, and removable power means for rotating said drum, said drum being removable from said lower cover member and provided with legs for holding the cut out portion in upright position when the drum is removed from said lower cover member.

References Cited

UNITED STATES PATENTS

| 121,292 | 11/1871 | Martin | 263—34 |
| 125,241 | 4/1872 | Williams | 263—33 |
| 201,920 | 4/1878 | Gilliland | 263—33 |
| 554,094 | 2/1896 | Smith | 233—34 |
| 1,004,472 | 9/1911 | Rosenkranz | 99—236 |
| 2,867,165 | 1/1959 | Money | 99—421 XR |
| 2,961,942 | 11/1960 | Terry | 99—443 XR |

FREDERICK L. MATTESON, JR., *Primary Examiner.*

A. D. HERRMANN, *Assistant Examiner.*